United States Patent
Ahmed

(10) Patent No.: US 7,599,418 B2
(45) Date of Patent: Oct. 6, 2009

(54) METHOD AND APPARATUS FOR A FREQUENCY HOPPER

(75) Inventor: Walid Khairy Mohamed Ahmed, Eatontown, NJ (US)

(73) Assignee: Pine Valley Investments, Inc., Las Vegas, NV (US)

( * ) Notice: Subject to any disclaimer, the term of this patent is extended or adjusted under 35 U.S.C. 154(b) by 602 days.

(21) Appl. No.: 11/355,569

(22) Filed: Feb. 16, 2006

(65) Prior Publication Data
US 2007/0201535 A1    Aug. 30, 2007

(51) Int. Cl.
*H04B 1/69* (2006.01)
*H04B 1/707* (2006.01)
*H04B 1/713* (2006.01)

(52) U.S. Cl. ............... 375/135; 375/133; 375/272; 375/303; 375/296; 375/297; 330/2; 331/17

(58) Field of Classification Search ......... 375/132–135, 375/272, 274, 275, 279, 303, 305, 307, 302, 375/296, 297; 330/2; 331/17
See application file for complete search history.

(56) References Cited

U.S. PATENT DOCUMENTS

| | | | |
|---|---|---|---|
| 5,524,286 A | 6/1996 | Chiesa et al. | |
| 5,598,436 A | 1/1997 | Brajal et al. | |
| 5,905,760 A | 5/1999 | Schnabl et al. | |
| 5,952,895 A | 9/1999 | McCune, Jr. et al. | |
| 6,043,707 A | 3/2000 | Budnik | |
| 6,094,101 A | 7/2000 | Sander et al. | |
| 6,125,266 A | 9/2000 | Matero et al. | |
| 6,140,882 A | 10/2000 | Sander | |
| 6,147,553 A | 11/2000 | Kolanek | |
| 6,255,912 B1 | 7/2001 | Laub et al. | |
| 6,449,465 B1 | 9/2002 | Gailus et al. | |
| 6,459,334 B2 * | 10/2002 | Wright et al. | 330/2 |
| 6,621,340 B1 | 9/2003 | Perthold et al. | |
| 6,834,084 B2 | 12/2004 | Hietala | |
| 2002/0098812 A1 | 7/2002 | Sourour et al. | |
| 2002/0186783 A1 | 12/2002 | Opas et al. | |
| 2002/0193085 A1 | 12/2002 | Mathe et al. | |
| 2003/0031267 A1 | 2/2003 | Hietala | |
| 2003/0095608 A1 | 5/2003 | Duperray | |
| 2003/0215025 A1 | 11/2003 | Hietala | |
| 2003/0215026 A1 | 11/2003 | Hietala | |
| 2004/0021517 A1 | 2/2004 | Irvine et al. | |
| 2004/0047432 A1 | 3/2004 | Iwasaki | |
| 2005/0017801 A1 | 1/2005 | Bachman, II et al. | |
| 2005/0122164 A1 | 6/2005 | Brandt et al. | |
| 2007/0057737 A1 * | 3/2007 | Davis et al. | 331/17 |

* cited by examiner

*Primary Examiner*—Phuong Phu
(74) *Attorney, Agent, or Firm*—Allen, Dyer, Doppelt, Milbrath & Gilchrist, P.A.

(57) ABSTRACT

A method and system for generating a frequency hopping electromagnetic signal based on a baseband data signal includes a frequency hopping pre-compensator. The frequency hopping pre-compensator determines a frequency hopping pre-compensation signal based on a desired frequency hopping sequence. The frequency hopping pre-compensation signal is combined with the baseband data signal to generate a pre-compensated baseband signal. An RF modulator modulates an RF carrier in accordance with the pre-compensated baseband signal to generate a modulated, frequency hopping RF carrier signal. An amplifier may then amplify the RF carrier signal as desired.

21 Claims, 6 Drawing Sheets

500

METHOD AND APPARATUS FOR A FREQUENCY HOPPER

FIELD OF THE INVENTION

The invention relates generally to methods and apparatus for generating a frequency hopping electromagnetic signal based on a desired frequency hopping sequence, and more particularly to pre-compensating a baseband signal based on the desired frequency hopping sequence.

BACKGROUND OF THE INVENTION

Electromagnetic waves and signals (hereinafter "signals") are utilized for many different purposes. For example, electromagnetic signals may be processed in order to convey information, such as by attenuating and/or amplifying electromagnetic wave characteristics, for instance, as is seen when modulating the amplitude, frequency or phase of an electrical current or radio frequency (RF) wave to transmit data. As another example, power may be conveyed along a wave in a controlled fashion by attenuating and or amplifying electromagnetic signals, such as is seen when modulating voltage or current in a circuit. Moreover, the uses may be combined, such as when information may be conveyed through a signal by processing power characteristics.

Electromagnetic signal processing may be accomplished through digital or analog techniques. Digital and analog attenuation and/or amplification also may be combined—that is, the same wave form may be subject to various types of digital and/or analog attenuation and/or amplification within a system in order to accomplish desired tasks.

Frequency hopping spread spectrum ("FHSS") is a method of transmitting electromagnetic signals by rapidly switching the carrier among many different frequencies. In a frequency hopping scheme, each successive communication frame is transmitted on a different frequency according to a pseudo-random sequencing code known by both the transmitter and the receiver. FHSS communications offer several advantages compared to communications on a single carrier frequency. For example, FHSS signals are both difficult to intercept and highly resistant to noise and interference. In addition, because FHSS signals are resistant to interference, many different FHSS communications can share the same frequency band with minimal interference. In a multi-user environment, this allows for more efficient use of bandwidth.

Frequency hopping spread spectrum technology is used in certain military wireless communication systems to avoid intentional jamming by hostile transmitters. Frequency hopping also can be found in certain civilian applications, such as the GSM wireless communication standard.

Conventional FHSS communication systems have involved the use of phase-locked loop systems, also known as phase-locked loops. In the processing of electronic signals, phase-locked loops may be used for a wide variety of purposes, such as frequency synthesizers and phase modulators in transceivers for wireless communications devices such as GSM (Global System for Mobile communications), PCS (Personal Communication System), PCN (Personal Communications Network), and DECT (Digital Enhanced Cordless Telecommunications) devices. In a typical phase-locked loop ("PLL"), a reference signal at a reference frequency is input to a phase/frequency detector along with a feedback signal derived from the output of the PLL. The output of the frequency/phase detector is filtered by a loop filter and applied to a voltage controlled oscillator ("VCO") to generate an output signal at the desired frequency. The output signal frequency then forms at least part of the feedback signal input to the phase/frequency detector.

Traditionally, frequency hoppers could achieve small frequency hops by changing the voltage bias on a VCO. However, large frequency hops can be difficult to achieve in this manner. Instead, conventional frequency hoppers have achieved large frequency hops by switching between multiple PLLs, where each PLL is tuned to a certain central frequency that matches one of the hopping choices.

The conventional approach of frequency hopping using multiple PLLs has several disadvantages. For example, the requirement of multiple PLLs complicates the circuitry of the frequency hopper. In addition, to hop in a timely manner and achieve an acceptable waveform quality, the PLLs must be designed such that they can lock into the required frequency in a very short period of time. Another disadvantage of a multiple-PLL frequency-hopper is that it requires fast switches.

Accordingly, there is a need for methods and systems for frequency-hopping that allow for fast, large frequency hops without the need for multiple PLLs or fast switches. There also is a need for a frequency hopper that is less dependent on the ability of a PLL to lock into a required frequency in a very short period of time.

BRIEF SUMMARY

According to one aspect of the invention, there is a method of generating a frequency hopping electromagnetic signal based on a baseband data signal and a desired frequency hopping sequence. The method includes determining the desired frequency hopping sequence. A frequency hopping pre-compensation signal is generated based on the desired frequency hopping sequence. The frequency hopping pre-compensation signal is combined with the baseband data signal to generate a pre-compensated baseband signal. An RF carrier is modulated in accordance with the pre-compensated baseband signal to generate the frequency hopping electromagnetic signal.

According to another aspect of the invention, there is a system for generating a frequency hopping electromagnetic signal based on a desired frequency hopping sequence. A frequency hopping pre-compensator is provided and configured to generate a pre-compensated baseband data signal based on a desired frequency hopping sequence. The system also includes an RF modulator in communication with the frequency hopping pre-compensator and configured to modulate an RF carrier wave in accordance with the pre-compensated baseband data signal.

Other systems, methods, features and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Embodiments of the invention include apparatus, methods and articles of manufacture for processing electromagnetic waves and signals. For illustration purposes, an exemplary embodiment comprises a frequency hopping pre-compensator. The frequency hopping pre-compensator described in this application may be implemented in a wide range of applications, such as, for example, a baseband processor, phase modulator, frequency modulator, amplifier, transmitter, etc. For purposes of illustration, an exemplary transmitter, including a frequency hopping pre-compensator and a phase modulator according to one aspect of the invention, is illustrated in FIG. 1.

Figure 1:
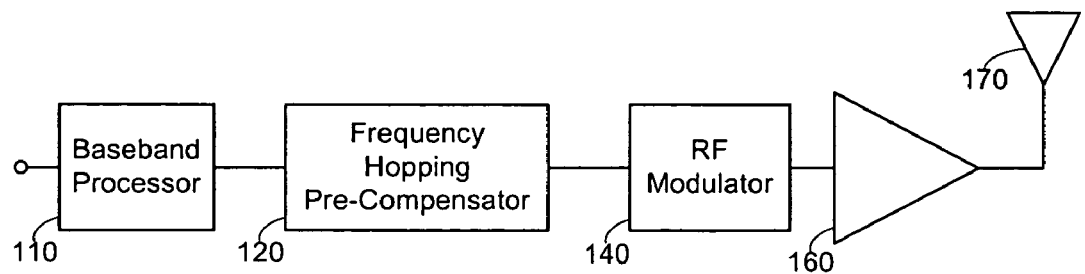
FIG. 1 is a block diagram illustrating a transmitter including a frequency hopping pre-compensator and an RF modulator according to one aspect of the invention.

One example of a transmitter according to one aspect of the invention is illustrated in FIG. 1. The transmitter 100 includes a baseband processor 110, a frequency hopping pre-compensator 120, an RF processor/modulator 140, a power amplifier 160, and an antenna 170. The various components of the exemplary transmitter 100, which are described in more detail below, may be analog or digital in nature. The exemplary transmitter 100 also may include a combination of analog and digital components. In addition, various of the transmitter components may be combined into a single component according to the design parameters of a particular application.

The term "signal," as is used herein, should be broadly construed to include any manner of conveying data from one place to another, such as, for example, an electric current or electromagnetic field, including without limitation, a direct current that is switched on and off or an alternating-current or electromagnetic carrier that contains one or more data streams. Data, for example, may be superimposed on a carrier current or wave by means of modulation, which may be accomplished in analog or digital form. The term "data" as used herein should also be broadly construed to comprise any type of intelligence or other information, such as, for example and without limitation, audio, video, and/or text information.

As illustrated in FIG. 1, the baseband processor 110 may be, for example, a digital signal processor, such as a digital signal processor capable of processing a baseband input signal and generating a baseband output signal. The baseband output signal generated by the baseband processor 110 in this embodiment may comprise a digital signal or an electromagnetic wave that contains data derived from the baseband input signal. Preferably, the baseband processor 110 includes an analog to digital converter and produces a digital baseband output signal.

The transmitter 100 also includes a frequency hopping pre-compensator 120, which is configured to determine a frequency hopping pre-compensation signal component and to combine the pre-compensation signal component with the baseband signal. As illustrated in FIG. 1, the pre-compensator 120 may combine the pre-compensation signal component with the baseband output signal after the baseband processor 110 has processed the baseband signal. Alternatively (and not shown in FIG. 1), the pre-compensator 120 may combine the pre-compensation signal component with the baseband input signal before the baseband processor 110 processes the baseband signal.

The frequency hopping pre-compensation signal component is based on the desired frequency hopping sequence. In combination, the pre-compensation signal and the baseband data signal produce a baseband data signal that is pre-compensated to generate the desired frequency hopping electromagnetic output signal when used to modulate an RF carrier wave. In the example illustrated in FIG. 1, the modulation is performed by RF modulator 140, which provides the modulated RF carrier wave to amplifier 160. As illustrated in FIG. 1, the amplified RF output of amplifier 160 may be provided to antenna 170 for transmission.

One advantage of the pre-compensator 120 is that it eliminates the need to change the frequency of the RF carrier wave in accordance with the desired frequency hopping sequence. Because the baseband data signal used to modulate the RF carrier wave is already pre-compensated in accordance with the desired frequency hopping sequence, it can be used to modulate a single-frequency RF carrier wave and generate the desired frequency hopping signal at the output of the modulator. As a result, the RF modulator 140 of the transmitter 100 illustrated in FIG. 1 requires only a single phase-locked loop to modulate the RF carrier and produce a frequency-hopped output signal.

Although the baseband processor 110 and frequency hopping pre-compensator 120 illustrated in FIG. 1 are shown as separate components, they may be combined in any manner desired or dictated by a particular application. In addition, the baseband processor 110 and frequency hopping pre-compensator 120 may be implemented using either analog or digital components. For example, they may be implemented as one or more integrated circuits. The baseband processor 110 and pre-compensator 120 also may be implemented using digital signal processing techniques. If digital components are used, it may be necessary to convert signals from analog to digital or vice versa by providing one or more analog-to-digital converters and/or digital-to-analog converters.

Figure 2:
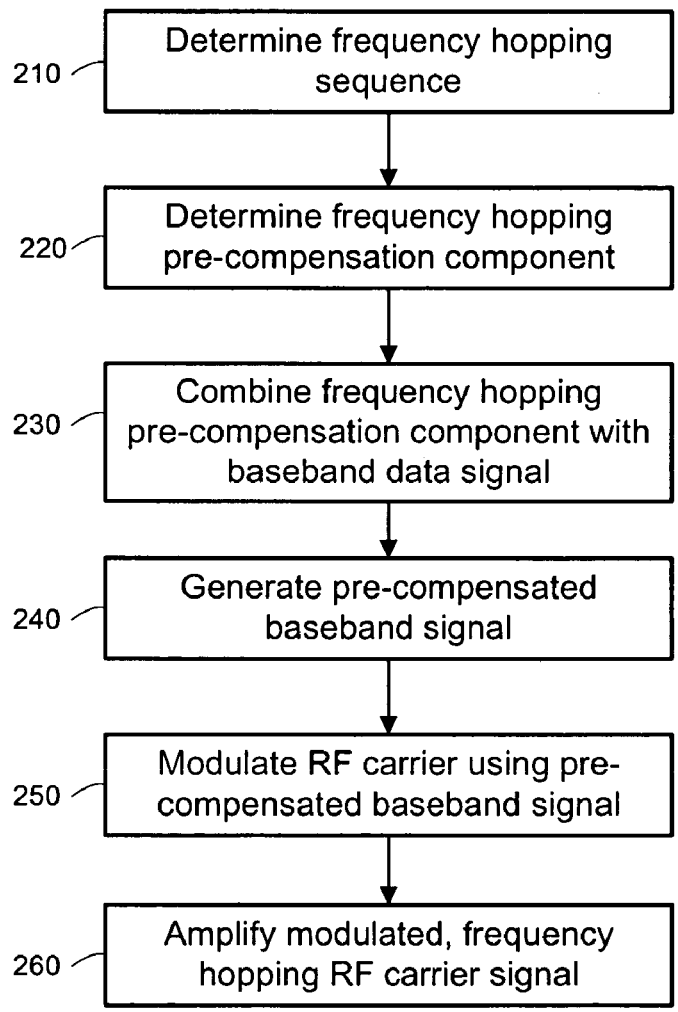
FIG. 2 is a flow diagram illustrating a method of generating a frequency hopping electromagnetic signal according to another aspect of the invention.

Turning now to FIG. 2, the flow diagram illustrates a method of generating a frequency hopping electromagnetic signal according to another aspect of the invention. This method may be used in a variety of frequency hopping applications. For example, the method may be used in conjunction with a transmitter such as the transmitters 100, 300, 500, 800, 900, and 1000 illustrated in FIGS. 1, 3, 5, 8, 9, and 10. According to the method illustrated in FIG. 2, a desired frequency hopping sequence is determined 210. The desired frequency hopping sequence may be a pseudorandom sequencing code known by both the transmitter and the receiver. For example, the desired frequency hopping sequence may be pre-programmed into both the transmitter and the receiver. Alternatively, the desired sequence may be communicated to the transmitter and/or the receiver prior to transmission of the frequency hopping communication. The desired sequence also may be determined in other alternative ways, as is known in the art.

Based on the desired frequency hopping sequence, a frequency hopping pre-compensation signal component is determined 220. The frequency hopping pre-compensation signal component is then combined 230 with a baseband data signal, and a pre-compensated baseband signal is generated 240. The pre-compensated baseband signal is then used to modulate 250 an RF carrier signal. The modulated, frequency hopping RF carrier signal may then be amplified 260 (or attenuated) as desired.

Figure 3:
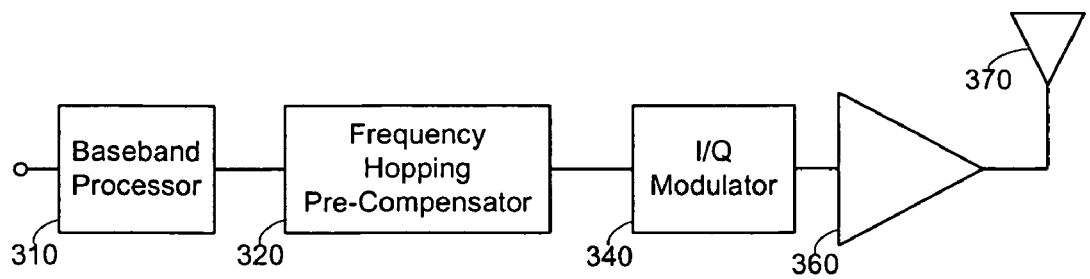
FIG. 3 is a block diagram illustrating a transmitter including a frequency hopping pre-compensator and an I/Q modulator according to another aspect of the invention.

FIG. 3 is a block diagram illustrating a transmitter including a frequency hopping pre-compensator and an I/Q modulator according to one aspect of the invention. The transmitter 300 includes a baseband processor 310, a frequency hopping pre-compensator 320, an I/Q processor/modulator 340, a power amplifier 360, and an antenna 370. As noted above with respect to the transmitter 100, the various components of the exemplary transmitter 300 may be analog or digital in nature. The exemplary transmitter 300 also may include a combination of analog and digital components. In addition, various of the transmitter components may be combined into a single component according to the design parameters of a particular application.

Like the baseband processor 110 illustrated in FIG. 1, the baseband processor 310 may be, for example, a digital signal processor, such as a digital signal processor capable of processing a baseband input signal and generating a baseband output signal. The baseband output signal generated by the baseband processor 310 in this embodiment may comprise a digital signal or an electromagnetic wave that contains data derived from the baseband input signal. Preferably, the baseband processor 310 includes an analog to digital converter and produces a digital baseband output signal.

The transmitter 300 also includes a frequency hopping pre-compensator 320, which is configured to determine a frequency hopping pre-compensation I/Q signal component and to combine the pre-compensation I/Q signal component with the I/Q baseband signal. As illustrated in FIG. 3, the pre-compensator 320 may combine the pre-compensation I/Q signal component with the I/Q baseband output signal after the baseband processor 310 has processed the baseband signal. Alternatively (and not shown in FIG. 3), the pre-compensator 320 may combine the pre-compensation I/Q signal component with the I/Q baseband input signal before the baseband processor 310 processes the baseband signal.

The frequency hopping pre-compensation I/Q signal component is based on the desired frequency hopping sequence. In combination, the pre-compensation I/Q signal and the I/Q baseband data signal produce a baseband data signal that is pre-compensated to generate the desired frequency hopping electromagnetic output signal when used to modulate an RF carrier wave. In the example illustrated in FIG. 3, the modulation is performed by I/Q modulator 340, which provides the modulated RF carrier wave to amplifier 360. As illustrated in FIG. 3, the amplified RF output of amplifier 360 may be provided to antenna 370 for transmission.

As noted above with respect to the pre-compensator 120 illustrated in FIG. 1, one advantage of the pre-compensator 320 is that it eliminates the need to change the frequency of the RF carrier wave in accordance with the desired frequency hopping sequence. Because the I/Q baseband data signal used to modulate the RF carrier wave is already pre-compensated in accordance with the desired frequency hopping sequence, it can be used to modulate a single-frequency RF carrier wave and generate the desired frequency hopping signal at the output of the modulator. As a result, the I/Q modulator 340 of the transmitter 300 illustrated in FIG. 3 requires only a single phase-locked loop to modulate the RF carrier and produce a frequency-hopped output signal.

Although the baseband processor 310 and frequency hopping pre-compensator 320 illustrated in FIG. 3 are shown as separate components, they may be combined in any manner desired or dictated by a particular application. In addition, the baseband processor 310 and frequency hopping pre-compensator 320 may be implemented using either analog or digital components. For example, they may be implemented as one or more integrated circuits. The baseband processor 310 and pre-compensator 320 also may be implemented using digital signal processing techniques. If digital components are used, it may be necessary to convert signals from analog to digital or vice versa by providing one or more analog-to-digital converters and/or digital-to-analog converters.

Figure 4:
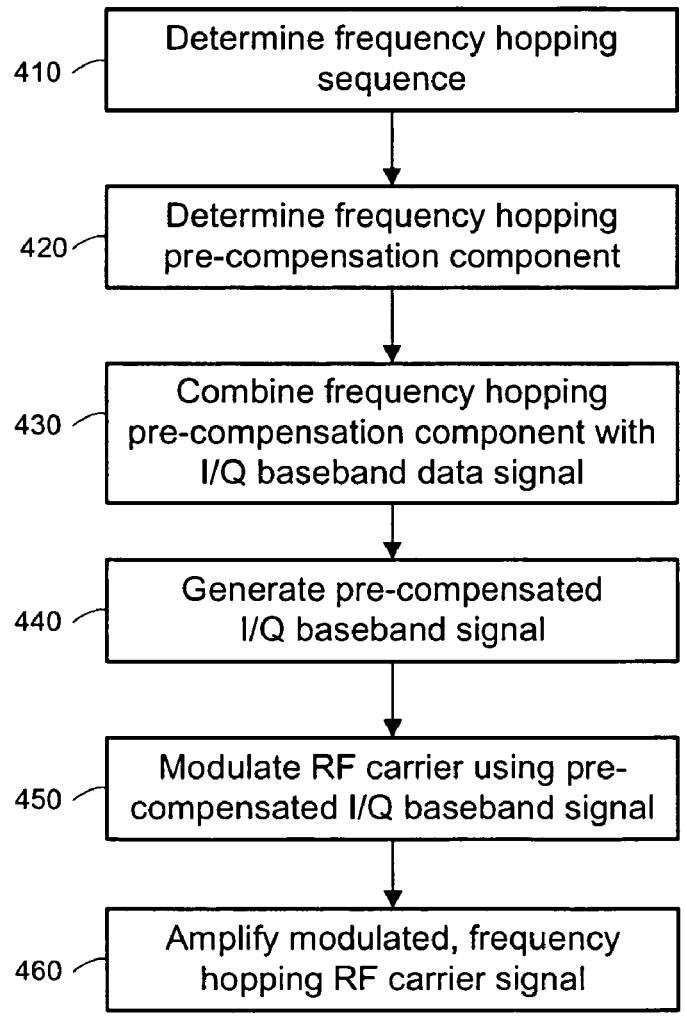
FIG. 4 is a flow diagram illustrating a method of generating a frequency hopping I/Q signal according to another aspect of the invention.

Turning now to FIG. 4, the flow diagram illustrates a method of generating a frequency hopping electromagnetic signal using an I/Q modulator according to another aspect of the invention. This method may be used in a variety of frequency hopping applications. For example, the method may be used in conjunction with a transmitter such as the transmitter 300 illustrated in FIG. 3. According to the method illustrated in FIG. 4, a desired frequency hopping sequence is determined 410. The desired frequency hopping sequence may be a pseudorandom sequencing code known by both the transmitter and the receiver. For example, the desired frequency hopping sequence may be pre-programmed into both the transmitter and the receiver. Alternatively, the desired sequence may be communicated to the transmitter and/or the receiver prior to transmission of the frequency hopping communication. The desired sequence also may be determined in other alternative ways, as is known in the art.

Based on the desired frequency hopping sequence, a frequency hopping pre-compensation signal component is determined 420. The frequency hopping pre-compensation signal component is then combined 430 with an I/Q baseband data signal, and a pre-compensated I/Q baseband signal is generated 440. The pre-compensated I/Q baseband signal is then used to modulate 450 an RF carrier signal using an I/Q modulator such as the I/Q modulator/processor 340 illustrated in FIG. 3, which may be either a phase or frequency I/Q modulator. The modulated, frequency hopping RF carrier signal may then be amplified 460 (or attenuated) as desired.

Determination 420 of the frequency hopping pre-compensation signal component may be performed, for example, by calculating a phase or frequency change required to pre-compensate the baseband data signal for the desired frequency hopping. For example, the desired frequency hopping sequence may be represented as $F=[f_0, \ldots, f_{n-1}]$, and the period between frequency hops may be T seconds. The desired modulated, frequency hopping RF carrier output signal may be represented as $s(t)=a(t)\cos(2\pi \cdot f(t)+\phi(t))$, where $a(t) \cdot e^{j\phi(t)}$ is the baseband data signal used to modulate the carrier wave without frequency hopping, and where $$f(t) = \sum_{i_{min}}^{i_{max}} f_i U(t - \mathrm{mod}(i, N) \cdot T)$$

$$U(t) = \begin{cases} 1; & 0 \le t \le T \\ 0; & \text{Otherwise} \end{cases}$$

$$\mathrm{mod}(i, N) = \text{remainder of } (i/N)$$

For modulation using an I/Q phase modulator, the pre-compensation signal component may be represented as a phase change $\Delta\phi(t)$. This phase change, when added to the I/Q baseband data signal, $$I(t)=a(t)\cos(\theta(t))$$

$$Q(t)=a(t)\sin(\theta(t)),$$

pre-compensates the baseband signal for the desired frequency hopping sequence to produce the pre-compensated I/Q baseband data signal.

For a continuous-phase baseband signal, the phase change may be calculated using the following equations:

$$\Delta\phi(t) = \int \sum_{i_{min}}^{i_{max}} \Delta f_i U(t - \mathrm{mod}(i, N) \cdot T) dt$$

$$\Delta f_i = f_i - f_c$$

$$U(t) = \begin{cases} 1; & 0 \le t \le T \\ 0; & \text{Otherwise} \end{cases}$$

The frequency delta, $\Delta f_i$ represents the difference between a particular hopping frequency $f_i$ and $f_c$, which may be any fixed frequency. For example, $f_c$ may be selected as the central RF hopping frequency.

For a non-continuous-phase baseband signal, the phase change may be calculated as follows:

$$\Delta\phi(t) = \sum_{i_{min}}^{i_{max}} \Delta f_i Z(t - \mathrm{mod}(i, N) \cdot T)$$

$$\Delta f_i = f_i - f_c$$

$$Z(t) = \begin{cases} t; & 0 \le t \le T \\ 0; & \text{Otherwise} \end{cases}$$

In both of these cases, the phase change $\Delta\phi(t)$ may be used as a pre-compensation signal component to pre-compensate the baseband data signal for the desired frequency hopping sequence. This may be accomplished by adding the phase change $\Delta\phi(t)$ to the baseband signal as follows:

$$I_{FH}(t)=a(t)\cos(\Delta\phi(t)+\theta(t))$$

$$Q_{FH}(t)=a(t)\sin(\Delta\phi(t)+\theta(t))$$

The resulting pre-compensated baseband data signal may then be used to modulate a single-frequency RF carrier wave to produce the desired modulated, frequency hopping RF output signal.

The systems and methods described above pertain generally to I/Q phase modulation of an RF carrier wave. The invention applies equally to I/Q frequency modulation. For modulation using an I/Q frequency modulator, the pre-compensation signal component may be represented as a frequency change $\Delta f(t)$. This frequency change, when added to the baseband data signal, $$I(t)=a(t)\cos(\theta(t))$$

$$Q(t)=a(t)\sin(\theta(t)),$$

pre-compensates the baseband signal for the desired frequency hopping sequence. The frequency change may be calculated using the following equations:

$$\Delta f(t) = \sum_{i_{min}}^{i_{max}} \Delta f_i U(t - \mathrm{mod}(i, N) \cdot T)$$

$$U(t) = \begin{cases} 1; & 0 \le t \le T \\ 0; & \text{Otherwise} \end{cases}$$

The frequency delta, $\Delta f_i$ represents the difference between a particular hopping frequency $f_i$ and $f_c$, which may be any fixed frequency. For example, $f_c$ may be selected as the central RF hopping frequency.

The calculated frequency change $\Delta f(t)$ may be used as a pre-compensation signal component to pre-compensate the baseband data signal for the desired frequency hopping sequence. This may be accomplished by adding the frequency change $\Delta f(t)$ to the I/Q baseband signal as follows:

$$I_{FH}(t)=a(t)\cos(2\pi\Delta f(t)+\theta(t))$$

$$Q_{FH}(t)=a(t)\sin(2\pi\Delta f(t)+\theta(t)).$$

The resulting pre-compensated I/Q baseband data signal may then be used to modulate a single-frequency RF carrier wave to produce the desired modulated, frequency hopping RF output signal.

Figure 5:
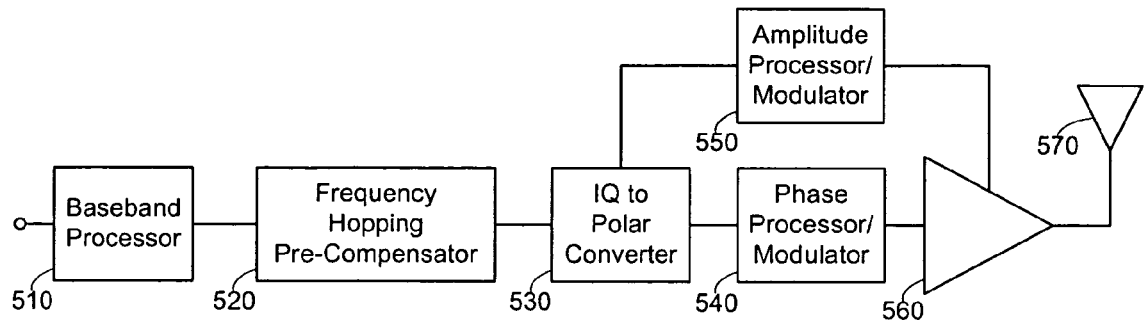
FIG. 5 is a block diagram illustrating a transmitter including a frequency hopping pre-compensator and a phase modulator according to another aspect of the invention.

FIG. 5 is a block diagram illustrating a transmitter 500 including a frequency hopping pre-compensator and a polar phase modulator according to another aspect of the invention. The transmitter 500 includes a baseband processor 510, a frequency hopping pre-compensator 520, an I/Q to polar converter 530, a phase processor/modulator 540, an amplitude processor/modulator 550, a power amplifier 560, and an antenna 570. The various components of the exemplary transmitter 500, which are described in more detail below, may be analog or digital in nature. The exemplary transmitter 500 also may include a combination of analog and digital components. In addition, various of the transmitter components may be combined into a single component according to the design parameters of a particular application.

Like the baseband processor 110 illustrated in FIG. 1, the baseband processor 510 shown in FIG. 5 may be, for example, a digital signal processor, such as a digital signal processor capable of processing a baseband input signal and generating a baseband output signal. The baseband output signal generated by the baseband processor 510 in this embodiment may comprise a digital signal or an electromagnetic wave that contains data derived from the baseband input signal. Preferably, the baseband processor 510 includes an analog to digital converter and produces a digital baseband output signal.

The transmitter 500 also includes a frequency hopping pre-compensator 520, which is configured to determine a frequency hopping pre-compensation signal component and to combine the pre-compensation signal component with the baseband signal. Like the pre-compensator 120 illustrated in FIG. 1, the pre-compensator 520 illustrated in FIG. 5 may combine the pre-compensation signal component with the baseband output signal after the baseband processor 510 has processed the baseband signal. Alternatively (and not shown in FIG. 5), the pre-compensator 520 may combine the pre-compensation signal component with the baseband input signal before the baseband processor 510 processes the baseband signal.

The frequency hopping pre-compensator 520 operates in much the same way described above with respect to FIG. 1. The frequency hopping pre-compensation signal component is based on the desired frequency hopping sequence. In combination, the pre-compensation signal and the baseband data signal produce a baseband data signal that is pre-compensated to generate the desired frequency hopping electromagnetic output signal when used to modulate an RF carrier wave. As noted above, one advantage of the pre-compensator 520 is that it eliminates the need to change the frequency of the RF carrier wave in accordance with the desired frequency hopping sequence. Because the baseband data signal used to modulate the RF carrier wave is already pre-compensated in accordance with the desired frequency hopping sequence, it can be used to modulate a single-frequency RF carrier wave and generate the desired frequency hopping signal at the output of the modulator. As a result, the phase processor/modulator 540 of the transmitter 500 illustrated in FIG. 5 requires only a single phase-locked loop to modulate the RF carrier and produce a frequency-hopped output signal.

The transmitter illustrated in FIG. 5 also includes a polar converter 530, which is configured to convert native baseband I/Q data from the Cartesian domain into the polar domain to create an analog or digital data control signal that contains the amplitude component of the input signal, and an electromagnetic signal that contains the phase component of the input signal. For example, the polar converter 530 may use a rectangular to polar converter, such as a coordinate rotation digital computer (CORDIC) algorithm, to output polar coordinates in the form R, P(sin) and P(cos). The R coordinate represents the amplitude component of the input signal, and the P(sin) and P(cos) coordinates represent the phase component of the signal.

Although the baseband processor 510, frequency hopping pre-compensator 520, and polar converter 530 illustrated in FIG. 5 are shown as separate components, they may be combined in any manner desired or dictated by a particular application. In addition, the baseband processor 510, frequency hopping pre-compensator 520, and polar converter 530 may be implemented using either analog or digital components. For example, they may be implemented as one or more integrated circuits. The baseband processor 510, pre-compensator 520, and/or polar converter 530 also may be implemented using digital signal processing techniques. If digital components are used, it may be necessary to convert signals from analog to digital or vice versa by providing one or more analog-to-digital converters and/or digital-to-analog converters.

In the transmitter illustrated in FIG. 5, the polar converter 530 receives the pre-compensated baseband signal from the pre-compensator 520 and converts the signal to polar form, including an amplitude component and a phase component. The amplitude and phase components of the input signal are then transmitted through separate paths to power amplifier 560. Optionally, the transmitter may include an amplitude processor/modulator 550 for processing and/or modulating the amplitude component of the pre-compensated baseband signal. For example, the amplitude component of the pre-compensated baseband signal may be modulated as a series of digital pulses comprising a digital word quantized into bits $B_0$ to $B_{N-1}$ with a most significant bit and a least significant bit. The digital word may be of varying lengths in various embodiments.

The phase component, in turn, preferably is processed separately by phase processor/modulator 540 and then applied to power amplifier 560. For example, the phase component may be modulated by the phase modulator 540 to yield an on-channel, phase modulated carrier. The phase modulated carrier may then be provided to the power amplifier 560. The power amplifier 560 may then combine the phase modulated carrier with the amplitude component to generate a fully-modulated carrier with the required output power signal level. This output signal is frequency hopped in accordance with the desired frequency hopping sequence as a result of the frequency hopping pre-compensation performed on the baseband signal by the pre-compensator 520.

Figure 6:
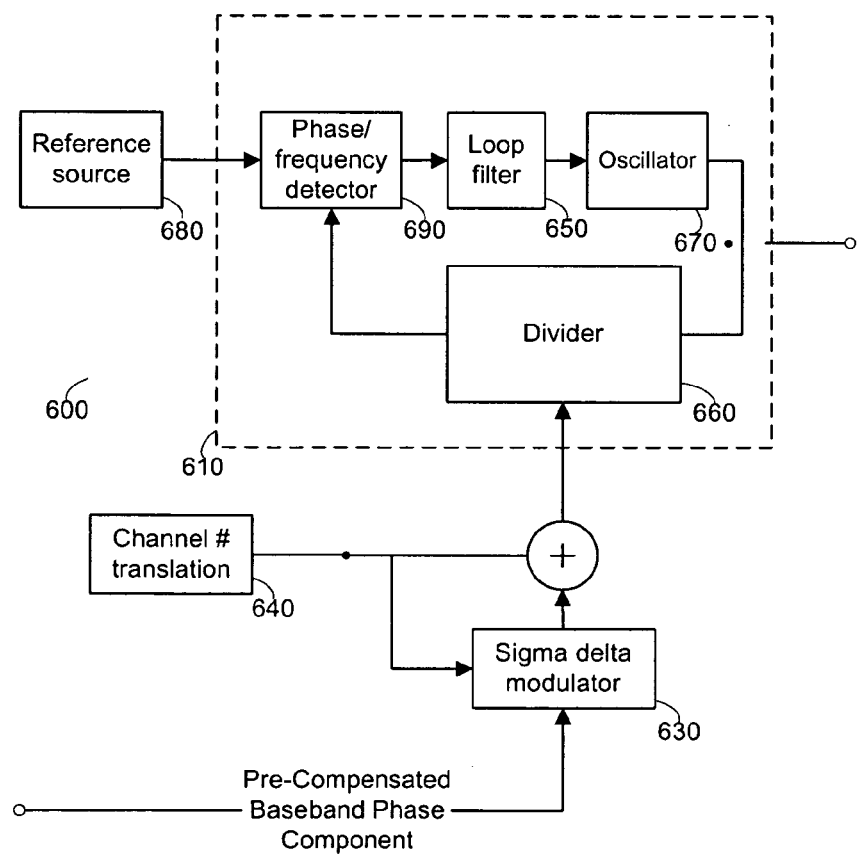
FIG. 6 is a block diagram illustrating a phase modulator including a phase locked loop according to another aspect of the invention.

One exemplary manner for processing the phase component of the input signal is illustrated in FIG. 6, which is a block diagram illustrating a digital phase processor/modulator 600 including a single phase-locked loop 610 according to another aspect of the invention. Although the particular phase modulator 600 illustrated in FIG. 6 is digital in nature, other types of phase/frequency modulators may be used in accordance with the invention, including analog modulators.

The phase modulator 600 receives the phase component signal in digital format from the polar converter 530 illustrated in FIG. 5 and modulates the phase component of the input signal onto an RF carrier wave with a selected center frequency $f_c$. For example, the center frequency about which a given signal is to be modulated may be determined by a channel calculation, by which the carrier wave frequency (e.g., 1880 MHz) is divided by the frequency of the reference source to establish a channel for the signal.

One type of channel calculation may yield a number that has an integer part and a fractional part. For example, channel calculator 640 may receive a channel number from baseband processor 510 and determine a selectable non-whole number by which the carrier wave of the phase modulator 600 is to be divided. This enables the selection of a channel on which the phase data signal is to be modulated. As an illustration of the channel calculation procedure, assuming a carrier wave frequency of 1880 MHz as an example, this number may be represented as 23.5 to 24.5 in relation to the reference frequency. The fractional portion of this number may then be combined with the data signal, which may be passed to the sigma delta modulator 230 in the phase modulator 200.

The sigma delta modulator 630 preferably is used in connection with the phase-locked loop 610 to achieve wideband modulation of the input signal phase component onto the RF carrier wave. Sigma delta modulator 630 serves to randomize and oversample the input signal phase component, with the average over multiple samples of the output being equal to the input. The sigma delta modulator 630 may frequency-shape the inherent quantization noise from the digitizing process so that at the desired frequencies, the quantization noise is low.

Sigma delta modulator 630 may include, for example, a series of adders/accumulators and feedback components for inputting the fractional phase/channel number data (which may be an analog or digital signal) and outputting a digitized series of integers that equal the fractional input. The sigma delta modulator 630 may be configured such that the input range is sufficient for phase modulation data as well as the fractional portion of the channel number. For example, sigma delta modulator 630 may be a three-bit system, which is capable of producing eight different output numbers (e.g., −3, −2, −1, 0, 1, 2, 3, and 4). It should be understood, however, that sigma delta modulator 630 may include any desired number of bits or elements. The sigma delta modulator 630 may produce four output integers for each sample of the input, yielding an oversampling rate of four times the input. Sampling of the input modulating data in sigma delta modulator 630 in this manner may introduce noise on the input modulating signal. Any such noise may be filtered by the loop filter 650 in the phase-locked loop 610.

As shown in FIG. 6, the sigma delta modulator 630 may receive the pre-compensated baseband phase component and the output from channel calculator 640 as direct inputs. However, other intermediate processing of these signals may be performed before the sigma delta modulation to suit a particular application.

The output of sigma delta modulator 630 is combined with the integer portion of the channel number received from channel calculator 640. For example, the combination may produce a number between 20 and 28. The combination of the fractional and integer portions of the channel number may be provided to divider 660 and used to lock the phase-locked loop 610 to the desired RF carrier.

The phase-locked loop 610 is used to modulate a signal synthesized by an RF carrier wave signal source, such as carrier wave source 670, using the phase component of the input signal. Carrier wave source 670 may be any source of electromagnetic waves that is capable of producing a carrier wave, such as a radio frequency voltage-controlled oscillator (VCO).

The frequency of reference source 680 (or a division thereof by some number) is compared with the output frequency of carrier wave source 670, divided by a series of numbers received by divider 660 from sigma delta modulator 630 and channel calculator 640. Reference source 680 may, for example, include a voltage-controlled oscillator of a constant or substantially constant frequency or may be derived from a source at another frequency.

Phase/frequency detector 690 is used to compare the relative phases of the two signals and output a signal that is proportional to the difference (phase shift) between them. This output signal may be utilized to adjust the frequency of carrier wave source 670 so that the phase difference measured at the phase-frequency detector 690 is substantially close and preferably equal to zero. Hence, the phase of the signal output by the phase processor/modulator 600 may be locked by the feedback loop of the phase-locked loop to prevent undesired drift of the signal phase due to variations (e.g., distortion) in the phase and frequency of the carrier wave source 670.

As illustrated in FIG. 6, the feedback signal from carrier wave source 670 may be passed through divider 660, with the division ratio of the divider controlled by the series of numbers representing the phase component information received from the sigma delta modulator 630 and the channel information received from channel calculator 640. The resulting signal may be passed to the phase/frequency detector 690, where it is compared with the signal from reference source 680, as noted above. This combined signal may be passed through the loop filter 650 and combined with the carrier wave signal generated by carrier wave source 670.

Returning now to FIG. 5, the processed wave output from phase modulator 540 may have a constant envelope (i.e., it may have no amplitude variations), yet it represents the phase component of the original input wave. In addition, because of the frequency hopping pre-compensation performed on the baseband signal, the output from the phase modulator 540 is frequency hopped in accordance with the desired frequency hopping sequence. This output wave may then be sent where desired, such as to power amplifier 560, which may include any of a variety of suitable types of amplifier components.

For example, power amplifier 560 may be adapted to act as a current source when it is appropriately regulated by the digital word output from the amplitude component of the input signal. As noted above, the amplitude component of the baseband signal may be processed and/or modulated by amplitude processor/modulator 550 and passed separately to the power amplifier 560. The amplitude component signal or signals may be used to actuate individual segments within the power amplifier 560 to amplify or attenuate the phase modulated carrier signal in relation to the original input signal. This may produce a combined output current from power amplifier 560 that represents an amplified or attenuated carrier wave containing the information from the input signal. One such amplifier is described in U.S. patent application Ser. No. 10/294,430, the disclosure of which is incorporated herein by reference. The combined current output from power amplifier 560 may then be used to transmit the modulated, frequency hopping carrier wave as an electromagnetic output signal via antenna 570.

Figure 7:
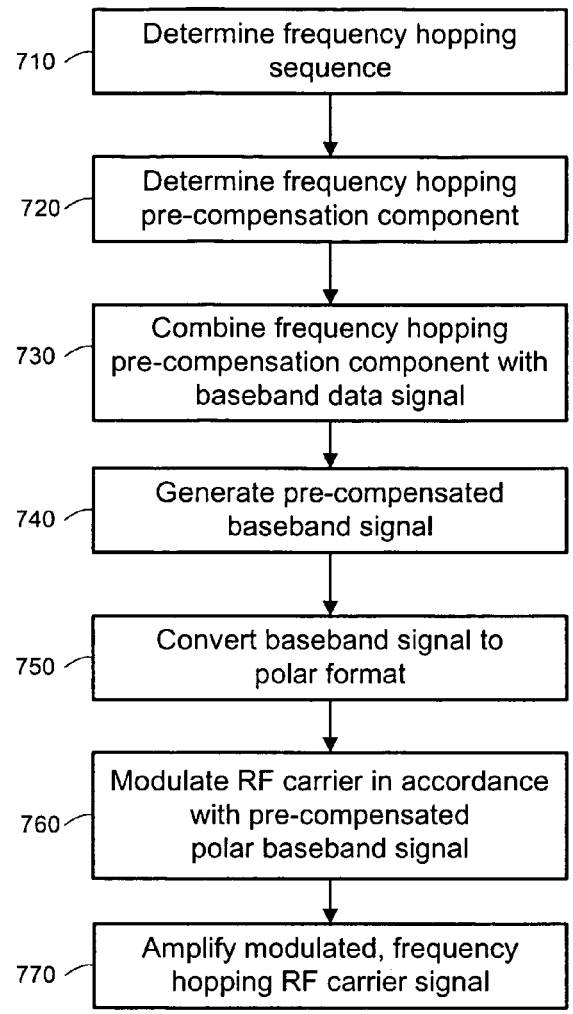
FIG. 7 is a flow diagram illustrating a method of generating a frequency hopping polar signal according to another aspect of the invention.

Turning now to FIG. 7, the flow diagram illustrates a method of generating a frequency hopping electromagnetic signal according to another aspect of the invention. This method may be used in a variety of frequency hopping applications. For example, the method may be used in conjunction with a transmitter such as the transmitter 500 illustrated in FIG. 5. According to the method illustrated in FIG. 7, a desired frequency hopping sequence is determined 710. The desired frequency hopping sequence may be a pseudorandom sequencing code known by both the transmitter and the receiver. For example, the desired frequency hopping sequence may be pre-programmed into both the transmitter and the receiver. Alternatively, the desired sequence may be communicated to the transmitter and/or the receiver prior to transmission of the frequency hopping communication. The desired sequence also may be determined in other alternative ways, as is known in the art.

Based on the desired frequency hopping sequence, a frequency hopping pre-compensation signal component is determined 720. The frequency hopping pre-compensation signal component is then combined 730 with a baseband data signal, and a pre-compensated baseband signal is generated 740. The pre-compensated baseband signal is converted 750 from native I/Q format to a polar format. The polar format includes both an amplitude component and a phase or frequency component, as discussed above. The pre-compensated polar baseband signal is then used to modulate 760 an RF carrier signal. The modulated, frequency hopping RF carrier signal may then be amplified 770 (or attenuated) as desired.

Determination 720 of the frequency hopping pre-compensation signal component may be performed, for example, by calculating a phase or frequency change required to pre-compensate the baseband data signal for the desired frequency hopping. For example, the desired frequency hopping sequence may be represented as $F=[f_0, \ldots, f_{N-1}]$, and the period between frequency hops may be $T$ seconds. The desired modulated, frequency hopping RF carrier output signal may be represented as $s(t)=a(t)\cos(2\pi \cdot f(t)+\phi(t))$, where $a(t) \cdot e^{j\phi(t)}$ is the baseband data signal used to modulate the carrier wave without frequency hopping, and where $$f(t) = \sum_{i_{min}}^{i_{max}} f_i U(t - \text{mod}(i, N) \cdot T)$$

$$U(t) = \begin{cases} 1; & 0 \le t \le T \\ 0; & \text{Otherwise} \end{cases}$$

$$\text{mod}(i, N) = \text{remainder of } (i/N)$$

For modulation using a phase modulator, such as the phase processor/modulators 540, 600 illustrated in FIG. 5 and 6, the pre-compensation signal component may be represented as a phase change $\Delta\phi(t)$. This phase change, when added to the baseband data signal $a(t) \cdot e^{j\phi(t)}$, pre-compensates the baseband signal for the desired frequency hopping sequence. For a continuous-phase baseband signal, the phase change may be calculated using the following equations:

$$\Delta\phi(t) = \int \sum_{i_{min}}^{i_{max}} \Delta f_i U(t - \text{mod}(i, N) \cdot T) dt$$

$$\Delta f_i = f_i - f_c$$

$$U(t) = \begin{cases} 1; & 0 \le t \le T \\ 0; & \text{Otherwise} \end{cases}$$

The frequency delta, $\Delta f_i$ represents the difference between a particular hopping frequency $f_i$ and $f_c$, which may be any fixed frequency. For example, $f_c$ may be selected as the central RF hopping frequency.

For a non-continuous-phase baseband signal, the phase change may be calculated as follows:

$$\Delta\phi(t) = \sum_{i_{min}}^{i_{max}} \Delta f_i Z(t - \text{mod}(i, N) \cdot T)$$

$$\Delta f_i = f_i - f_c$$

$$Z(t) = \begin{cases} t; & 0 \le t \le T \\ 0; & \text{Otherwise} \end{cases}$$

In both of these cases, the phase change $\Delta\phi(t)$ may be used as a pre-compensation signal component to pre-compensate the baseband data signal for the desired frequency hopping sequence. This may be accomplished by adding the phase change $\Delta\phi(t)$ to the baseband signal as follows:

$$s(t) = a(t)\cos(2\pi f_c t + \Delta\phi(t) + \phi(t))$$

The resulting pre-compensated baseband data signal, s(t), may then be used to modulate a single-frequency RF carrier wave to produce the desired modulated, frequency hopping RF output signal.

Figure 8:
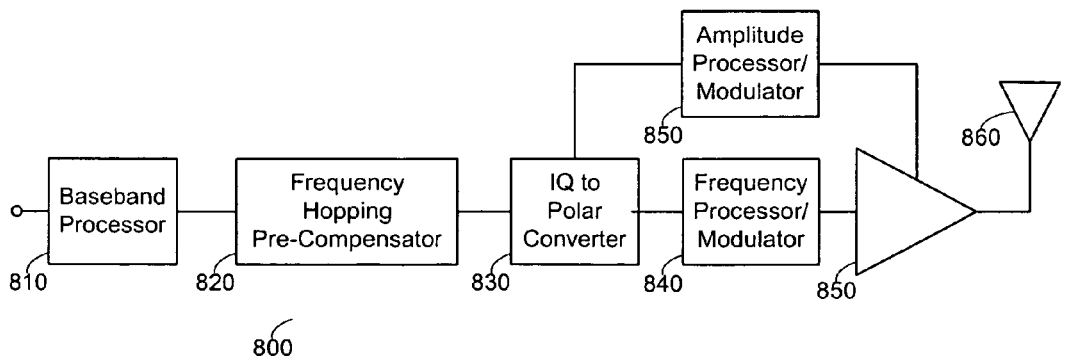
FIG. 8 is a block diagram illustrating a transmitter including a frequency hopping pre-compensator and a frequency modulator according to another aspect of the invention.

The systems and methods described above with respect to FIGS. 5, 6, and 7 pertain generally to polar phase modulation of an RF carrier wave. The invention applies equally to polar frequency modulation. FIG. 8 is a block diagram illustrating a transmitter 800 including a frequency hopping pre-compensator 820 and a polar frequency processor/modulator 840 according to another aspect of the invention. The transmitter 800 illustrated in FIG. 8 is similar to the transmitter 500 illustrated in FIG. 5, except that it includes the frequency processor/modulator 840 in place of the phase processor/modulator 540 illustrated in FIG. 5. In addition, the polar converter 830 illustrated in FIG. 8 is configured to convert native baseband I/Q data from the Cartesian domain into the polar domain to create an analog or digital data control signal that contains the amplitude component of the input signal, and an electromagnetic signal that contains the frequency component of the input signal.

Although the baseband processor 810, frequency hopping pre-compensator 820, and polar converter 830 illustrated in FIG. 8 are shown as separate components, they may be combined in any manner desired or dictated by a particular application. In addition, like the components of the transmitters 100, 500 shown in FIGS. 1 and 5, the baseband processor 810, frequency hopping pre-compensator 820, and polar converter 830 may be implemented using either analog or digital components. For example, they may be implemented as one or more integrated circuits. The baseband processor 810, pre-compensator 820, and/or polar converter 830 also may be implemented using digital signal processing techniques. If digital components are used, it may be necessary to convert signals from analog to digital or vice versa by providing one or more analog-to-digital converters and/or digital-to-analog converters.

For modulation using a frequency modulator, such as the frequency processor/modulator 840 illustrated in FIG. 8, the pre-compensation signal component may be represented as a frequency change $\Delta f(t)$. This frequency change, when added to the baseband data signal $a(t) \cdot e^{j\phi(t)}$, pre-compensates the baseband signal for the desired frequency hopping sequence. The frequency change may be calculated using the following equations:

$$\Delta f(t) = \sum_{i_{min}}^{i_{max}} \Delta f_i U(t - \text{mod}(i, N) \cdot T)$$

$$U(t) = \begin{cases} 1; & 0 \le t \le T \\ 0; & \text{Otherwise} \end{cases}$$

The frequency delta, $\Delta f_i$ represents the difference between a particular hopping frequency $f_i$ and $f_c$, which may be any fixed frequency. For example, $f_c$ may be selected as the central RF hopping frequency.

The calculated frequency change $\Delta f(t)$ may be used as a pre-compensation signal component to pre-compensate the baseband data signal for the desired frequency hopping sequence. This may be accomplished by adding the frequency change $\Delta f(t)$ to the baseband signal as follows:

$$s(t) = a(t)\cos(2\pi f_c t + \Delta f(t)t + \phi(t))$$

The resulting pre-compensated baseband data signal, s(t), may then be used to modulate a single-frequency RF carrier wave to produce the desired modulated, frequency hopping RF output signal.

Figure 9:
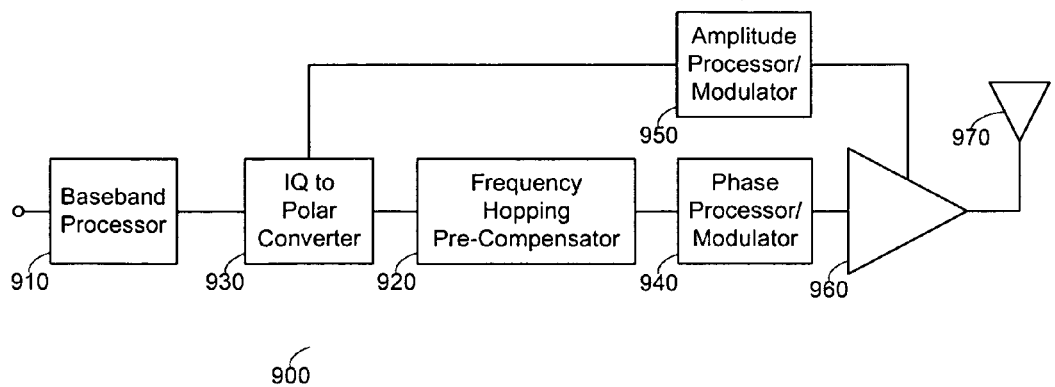
FIG. 9 is a block diagram illustrating a transmitter including a frequency hopping pre-compensator and a phase modulator according to another aspect of the invention.
Figure 10:
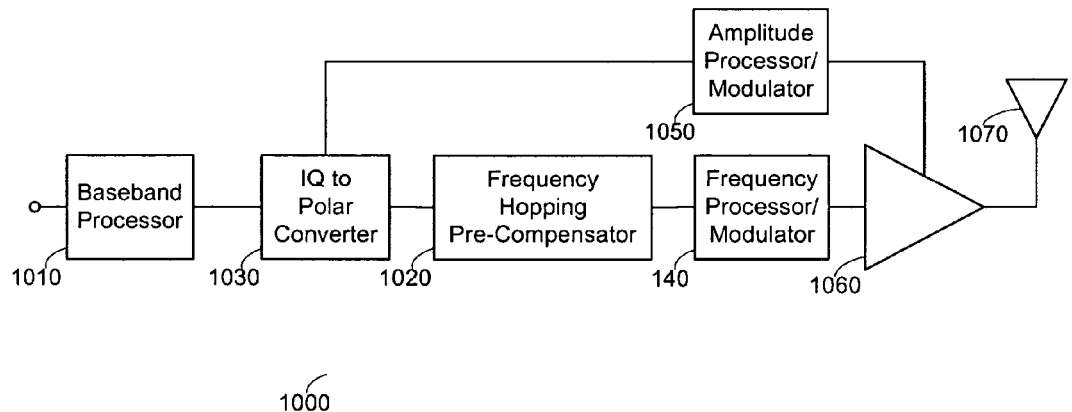
FIG. 10 is a block diagram illustrating a transmitter including a frequency hopping pre-compensator and a frequency modulator according to another aspect of the invention.

As discussed above and illustrated in FIGS. 5, 6, and 7, the frequency hopping baseband pre-compensation may be performed before the baseband data signal is converted to polar form. This sequence of operations also may be reversed. FIGS. 9 and 10 are block diagrams that illustrate transmitters according to other aspects of the invention in which the baseband data signal is converted to polar form before the frequency hopping pre-compensation.

FIG. 9 is a block diagram illustrating a transmitter 900 including a frequency hopping pre-compensator 920 and a phase modulator 940 according to another aspect of the invention. The transmitter 900 is similar to the transmitter 500 illustrated in FIG. 5, but the polar converter 930 is provided between the baseband processor 910 and the frequency hopping pre-compensator 920. As a result, the polar converter 930 is configured to convert the baseband data signal to polar form before the baseband signal is pre-compensated for frequency hopping. In the transmitter illustrated in FIG. 9, the polar converter 930 converts the baseband data signal into an amplitude component and a phase component. The amplitude component is passed to the amplifier 960. Optionally, the transmitter 900 may include an amplitude processor/modulator 950 for processing and/or modulating the baseband data signal amplitude component before it is passed to the amplifier 960.

The baseband data signal phase component is passed to the frequency hopping pre-compensator 920, which pre-compensates the phase component of the baseband data signal in much the same way as described above with respect to FIGS. 5 and 7. For example, the pre-compensator may apply a phase change $\Delta\phi(t)$ to the baseband data signal phase component and generate a pre-compensated baseband data signal phase component as follows:

$$s_{phase}(t) = \cos(2\pi f_c t + \Delta\phi(t) + \phi(t))$$

The pre-compensated baseband data signal phase component is then processed separately by phase processor/modulator 940 and applied to power amplifier 960. For example, the phase component may be modulated by the phase modulator 940 to yield an on-channel, phase modulated carrier. The phase modulated carrier may then be provided to the power amplifier 960. The power amplifier 960 may then combine the phase modulated carrier with the amplitude component to generate a fully-modulated carrier with the required output power signal level. This output signal is frequency hopped in accordance with the desired frequency hopping sequence as a result of the frequency hopping pre-compensation performed on the phase component of the baseband data signal by the pre-compensator 920.

FIG. 10 is a block diagram illustrating a transmitter 1000 including a frequency hopping pre-compensator 1020 and a frequency modulator 1040 according to another aspect of the invention. The transmitter 1000 is similar to the transmitter 900 illustrated in FIG. 9, but the transmitter 1000 is configured for frequency modulation. As a result, the transmitter 1000 includes a frequency processor/modulator 1040 instead of a phase modulator. In addition, the polar converter 1030 illustrated in FIG. 10 is configured to convert native baseband I/Q data from the Cartesian domain into the polar domain to create an analog or digital data control signal that contains the amplitude component of the baseband data signal, and an electromagnetic signal that contains the frequency component of the baseband data signal.

In the transmitter 1000 illustrated in FIG. 10, the baseband data signal frequency component is passed to the frequency hopping pre-compensator 1020, which pre-compensates the frequency component of the baseband data signal in much the same way as described above with respect to FIGS. 7 and 8. For example, the pre-compensator may apply a frequency change $\Delta f(t)$ to the baseband data signal phase component and generate a pre-compensated baseband data signal frequency component as follows:

$$s_{freq}(t) = \cos(2\pi f_c t + \Delta f(t) + \phi(t))$$

The pre-compensated baseband data signal frequency component is then processed separately by frequency processor/modulator 1040 and applied to power amplifier 1060. For example, the frequency component may be modulated by the frequency modulator 1040 to yield a frequency modulated carrier. The frequency modulated carrier may then be provided to the power amplifier 1060. The power amplifier 1060 may then combine the frequency modulated carrier with the amplitude component to generate a fully-modulated carrier with the required output power signal level. This output signal is frequency hopped in accordance with the desired frequency hopping sequence as a result of the frequency hopping pre-compensation performed on the frequency component of the baseband data signal by the pre-compensator 1020.

Figure 11:
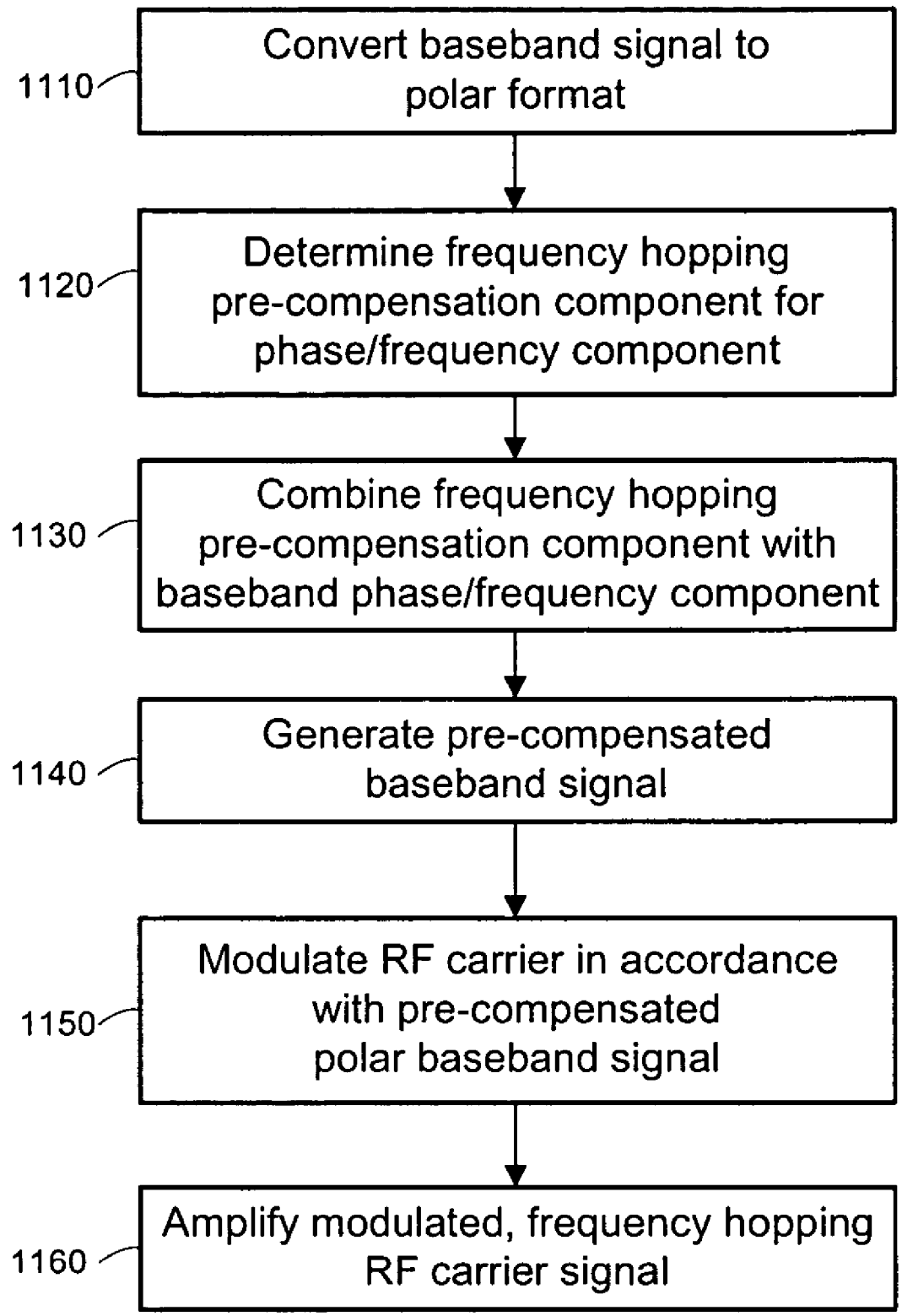
FIG. 11 is a flow diagram illustrating a method of generating a frequency hopping polar signal according to another aspect of the invention.

Turning now to FIG. 11, the flow diagram illustrates a method of generating a frequency hopping electromagnetic signal according to another aspect of the invention. This method may be used in a variety of frequency hopping applications. For example, the method may be used in conjunction with a transmitter such as the transmitters 900 and 1000 illustrated in FIGS. 9 and 10. The method is similar to that illustrated in FIG. 7, but the polar conversion is performed before the pre-compensation.

According to the method illustrated in FIG. 11, the baseband data signal is converted 1110 from native I,Q format to a polar format. The polar format includes both an amplitude component and a phase or frequency component, as discussed above. Based on the desired frequency hopping sequence, a frequency hopping pre-compensation signal component is determined 1120. The frequency hopping pre-compensation signal component is then combined 1130 with the baseband data signal phase or frequency component, and a pre-compensated baseband phase or frequency signal component is generated 1140. The pre-compensated polar baseband phase or frequency signal component is then used to modulate 1160 an RF carrier signal. The modulated, frequency hopping RF carrier signal may then be amplified 1170 (or attenuated) as desired, for instance, in accordance with the processed and/or modulated amplitude signal component.

Certain transmitters, receivers, transceivers, and other components such as the phase modulator 540 may be specialized for particular input signals, carrier waves, and output signals (e.g., various types of cell phones, such as CDMA (Code Division Multiple Access), CDMA2000, (WCDMA Wideband CDMA), GSM (Global System for Mobile communications, TDMA (Time Division Multiple Access)), as well as various other types of devices, both wired and wireless (e.g., Bluetooth, 802.11a, -b, -g, radar, IxRTT (Interexchange Radio Transmission Techniques), radios, GPRS (General Packet Radio Service), computers, computer or non-computer communication devices, or handheld devices). The modulation schemes used in these environments may include, for example, GMSK, which is used in GSM; GFSK (Gaussian Frequency-Shift Keying), which is used in DECT (Diqital Enhanced Cordless Telecommunications) & Bluetooth; 8-PSK (Phase-Shift Keying), which is used in EDGE (Enhanced Data Rates for GSM Evolution); OQPSK (Offset Quadrature Phase-Shift Keying) & HPSK (Hybrid Phase Shift Keying), which are used in IS-2000; p/4 DQPSK (Differential Quadrature Phase Shift Keying), which is used in TDMA; and OFDM (Orthogonal Frequency-Division Multiplexing), which is used in 802.11.

It is intended that the foregoing detailed description be regarded as illustrative rather than limiting, and that it be understood that the following claims, including all equivalents, are intended to define the scope of this invention.

The invention claimed is:

1. A method of generating a frequency hopping electromagnetic signal based on a baseband data signal and a desired frequency hopping sequence, comprising:

determining, by a processor, the desired frequency hopping sequence;

determining, by a frequency hopping pre-compensator in communication with the processor, a frequency hopping pre-compensation signal component based on the desired frequency hopping sequence;

combining, by the frequency hopping pre-compensator, the frequency hopping pre-compensation signal component with the baseband data signal to generate a pre-compensated baseband signal;

converting, by a polar converter in communication with the frequency hopping pre-compensator, the pre-compensated baseband signal to a polar signal; and modulating, by an RF modulator in communication with the polar converter, an RF carrier in accordance with the polar pre-compensated baseband signal.

2. The method of claim 1, further comprising:
amplifying the modulated RF carrier to generate a modulated, frequency hopping electromagnetic output signal.

3. The method of claim 1, wherein the RF carrier is modulated using a single phase-locked loop.

4. The method of claim 1,
wherein the polar signal includes a baseband amplitude component and a pre-compensated baseband phase component, the method further comprising:
providing the baseband amplitude component to an amplitude modulator; and
providing the pre-compensated baseband phase component to a phase modulator.

5. The method of claim 1,
wherein the polar signal includes a baseband amplitude component and a pre-compensated baseband frequency component, the method further comprising:
providing the baseband amplitude component to an amplitude modulator; and
providing the pre-compensated baseband frequency component to a frequency modulator.

6. The method of claim 1, further comprising:
wherein the polar signal includes a baseband data signal amplitude component and a baseband data signal phase component;
wherein generating the frequency hopping pre-compensation signal comprises generating a frequency hopping pre-compensation phase signal;
wherein of combining the frequency hopping pre-compensation signal with the baseband data signal comprises combining the frequency hopping pre-compensation phase signal with the baseband data signal phase component to generate a pre-compensated baseband phase signal; and
wherein the RF carrier is modulated using the pre-compensated baseband phase signal.

7. The method of claim 1, further comprising:
wherein the polar signal includes a baseband amplitude data signal component and a pre-compensated baseband data signal frequency component;
wherein generating the frequency hopping pre-compensation signal comprises generating a frequency hopping pre-compensation frequency signal;
wherein combining the frequency hopping pre-compensation signal with the baseband data signal comprises combining the frequency hopping pre-compensation frequency signal with the pre-compensated baseband data signal frequency component to generate a pre-compensated baseband frequency signal; and
wherein the RF carrier is modulated using the pre-compensated baseband frequency signal.

8. A system for generating a frequency hopping electromagnetic signal based on a desired frequency hopping sequence, comprising:
a frequency hopping pre-compensator configured to generate a pre-compensated baseband data signal based on a desired frequency hopping sequence;
a polar converter in communication with the frequency-hopping pre-compensator and configured to convert the pre-compensated baseband data signal to a polar signal; and
an RF modulator in communication with the frequency hopping pre-compensator and configured to modulate an RF carrier wave in accordance with the polar, pre-compensated baseband data signal.

9. The system of claim 8, further comprising:
an amplifier in communication with the RF modulator and configured to amplify the modulated RF carrier to generate a modulated, frequency hopping electromagnetic output signal.

10. The system of claim 8, wherein the RF modulator includes a single phase-locked loop.

11. The system of claim 8, further comprising:
wherein the polar signal includes a baseband amplitude data signal component and a pre-compensated baseband data signal phase component;
wherein the RF modulator is further configured to modulate the RF carrier wave in accordance with the pre-compensated baseband data signal phase component.

12. The system of claim 8, further comprising:
wherein the polar signal includes a baseband amplitude data signal component and a pre-compensated baseband data signal frequency component;
wherein the RF modulator is further configured to modulate the RF carrier wave in accordance with the pre-compensated baseband data signal frequency component.

13. The system of claim 8, further comprising:
wherein the polar signal includes a baseband amplitude data signal component and a baseband data signal phase component;
wherein the frequency hopping pre-compensator is configured to receive the baseband data signal phase component from the polar converter.

14. The system of claim 8, further comprising:
wherein the polar signal includes a baseband amplitude data signal component and a baseband data signal frequency component;
wherein the frequency hopping pre-compensator is configured to receive the baseband data signal frequency component from the polar converter.

15. A system for generating a frequency hopping electromagnetic signal based on a desired frequency hopping sequence, comprising:
means for determining a desired frequency hopping sequence;
means for generating a frequency hopping pre-compensation signal based on the desired frequency hopping sequence;
means for combining the frequency hopping pre-compensation signal with a baseband data signal to generate a pre-compensated baseband signal;
means for converting the pre-compensated baseband signal to a polar signal; and
means for modulating an RF carrier in accordance with the polar, pre-compensated baseband signal.

16. The system of claim 15, further comprising:
an amplitude modulator;

a phase modulator; and wherein the polar signal includes a baseband amplitude component that is received by the amplitude modulator and a pre-compensated baseband phase component that is received by the phase modulator.

17. The system of claim 15, further comprising:

an amplitude modulator;

a frequency modulator; and wherein the polar signal includes a baseband amplitude component that is received by the amplitude modulator and a pre-compensated baseband frequency component that is received by the frequency modulator.

18. The system of claim 15, further comprising:

wherein the polar signal includes a baseband amplitude component and a baseband phase component;

wherein the means for generating the frequency hopping pre-compensation signal includes means for generating a frequency hopping pre-compensation phase signal;

wherein the means for combining the frequency hopping pre-compensation signal with the baseband data signal includes means for combining the frequency hopping pre-compensation phase signal with the baseband phase component to generate a pre-compensated baseband phase signal; and wherein the means for modulating the RF carrier includes means for modulating the RF carrier in accordance with the pre-compensated baseband phase signal.

19. The system of claim 15, further comprising:

wherein the polar signal includes a pre-compensated baseband amplitude component and a pre-compensated baseband frequency component;

wherein the means for generating the frequency hopping pre-compensation signal includes means for generating a frequency hopping pre-compensation frequency signal;

wherein the means for combining the frequency hopping pre-compensation signal with the baseband data signal includes means for combining the frequency hopping pre-compensation frequency signal with the pre-compensated baseband frequency component to generate a pre-compensated baseband frequency signal; and wherein the means for modulating the RF carrier includes means for modulating the RF carrier in accordance with the pre-compensated baseband frequency signal.

20. The system of claim 15, wherein means for modulating the RF carrier includes a single phase-locked loop.

21. The system of claim 15, further comprising:

means for receiving and amplifying the modulated RF carrier to generate a modulated, frequency hopping electromagnetic output signal.

* * * * *